United States Patent [19]

Betts

[11] 4,391,196
[45] Jul. 5, 1983

[54] ADD-ON IGNITER FOR PYROGEN TYPE IGNITER

[75] Inventor: Robert E. Betts, Huntsville, Ala.

[73] Assignee: The United States of America as represented by the Secretary of the Army, Washington, D.C.

[21] Appl. No.: 255,906

[22] Filed: Apr. 20, 1981

[51] Int. Cl.³ .............................................. F02K 9/95
[52] U.S. Cl. ................................. 102/202; 60/39.823
[58] Field of Search ............ 102/202; 60/256, 39.82 E

[56] References Cited

U.S. PATENT DOCUMENTS

| | | | |
|---|---|---|---|
| 2,561,670 | 7/1951 | Miller et al. | 102/202 |
| 2,685,837 | 8/1954 | Sage et al. | 102/202 |
| 2,934,014 | 4/1960 | Smith et al. | 102/202 |
| 2,935,948 | 5/1960 | Porter | 102/202 |
| 3,166,899 | 1/1965 | Keathley | 102/202 |
| 3,170,287 | 2/1965 | Adelman | 102/202 |

*Primary Examiner*—Charles T. Jordan

*Attorney, Agent, or Firm*—Nathann Edelberg; Robert P. Gibson; Jack W. Voigt

[57] ABSTRACT

Disclosed is an add-on pyrotechnic package to a pyrogen igniter for a solid propellant rocket motor which employs a perforated solid propellant grain. The pyrotechnic package is comprised of a container fabricated out of a material selected from pressed paper, plastic, or metal and contains pyrotechnic pellets selected from boron-potassium nitrate ($B/KNO_3$), aluminum-potassium perchlorate ($Al/KClO_4$), titanium-aluminium-potassium perchlorate ($Ti-Al/KClO_4$), and large granules of black powder. The combination of the pyrogen igniter and the add-on pyrotechnic package when fired performs the functions of sweeping away any propellant components that have migrated to the propellant surfaces or that have formed on the propellant surfaces from chemical reactions, igniting the propellant perforated grain, and maintaining the pressure in the solid propellant rocket motor chamber to achieve more efficient ignition and performance of the rocket motor.

2 Claims, 1 Drawing Figure

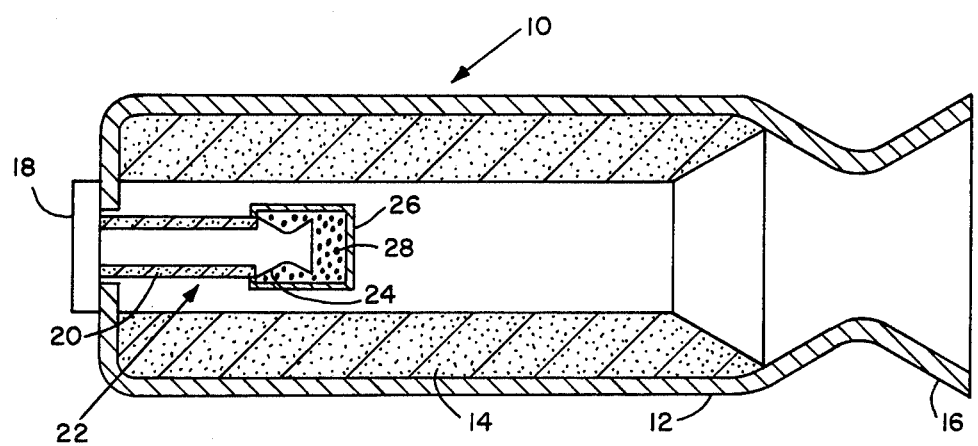

ADD-ON IGNITER FOR PYROGEN TYPE IGNITER

DEDICATORY CLAUSE

The invention described herein may be manufactured, used, and licensed by or for the Government for governmental purposes without the payment to me of any royalties thereon.

BACKGROUND OF THE INVENTION

One problem associated with solid propellant rocket motors is that with age their performances may change. Some changes may be only slightly detectable while other changes which were not detected by routine inspection procedures may result in complete failure of the solid propellant rocket motor.

A performance factor often effected is the ignition transits. Usually the change in ignition is a slower pressure rate rise within the solid propellant rocket motor. A controlling factor to this reduced pressure rate rise often relates to changes in the propellant surfaces of the solid propellant rocket motor. Some of the changes often relate to migration of the propellant ingredients to the propellant surfaces. Other changes relate to chemical changes on the propellant surfaces. Either of these changes or a combination of these changes are the primary causes of performance changes.

In order to overcome the deficiencies resulting from migratory changes and/or chemical changes to the solid propellant surfaces, the normal procedure is to redesign the igniter output so that the igniter action "sweeps away" the undesired propellant surface while maintaining the proper pressure within the solid propellant rocket motor. With pyrogen igniters such a redesign results in a change of both hardware and propellant configuration.

Advantageous would be a solution which does not effect pyrogen igniter design which likewise does not result in changes to both the hardware and propellant configuration.

Therefore, an object of this invention is to provide an add-on to an already existing pyrogen igniter that results in a desired ignition of a propellant surface that has undergone changes.

Another object of this invention is to provide an add-on pyrotechnic package that employs a pyrotechnic selected from proven pyrotechnics having compatibility with the solid propellant composition and the solid propellant rocket motor environment with which it is to be used.

A further object of this invention is to provide an add-on pyrotechnic package that is adapted for attaching to the nozzle of a pyrogen igniter so that igniting of the pyrotechnic is effected by the exhaust gases from the pyrogen igniter to thereby provide rapid ignition of the solid propellant and maintain rapid pressure rise of the solid propellant rocket motor in which the pyrogen igniter with the add-on pyrotechnic package is installed.

SUMMARY OF THE INVENTION

An add-on pyrotechnic package igniter employed in a solid propellant rocket motor obviates the need for pyrogen igniter redesign hardware and output required for rapid ignition of a solid propellant grain and for rapid pressurization of the solid propellant rocket motor.

The add-on pyrotechnic package is comprised of a suitable container which is adapted for attachment to the exhaust nozzle of a pyrogen igniter and which is filled with pyrotechnic pellets selected from boron-potassium nitrate ($B/KNO_3$), aluminum-potassium perchlorate ($Al/KClO_4$), titanium-aluminum-potassium-perchlorate ($Ti-Al/KClO_4$), and large granules of black powder. A suitable container for containing the pyrotechnic can be constructed of either plastic, pressed paper, or metal. The pyrotechnic particle sizes of pellets or granules may vary in size depending on the solid propellant rocket motor length. The longer the solid propellant rocket motor the larger the pellet size should be in the pyrotechnic package.

BRIEF DESCRIPTION OF THE DRAWING

The FIGURE of the drawing shows a sectional view of a solid propellant rocket motor with a pyrogen ignition system fitted with an add-on pyrotechnic package in accordance with the invention.

DESCRIPTION OF THE PREFERRED EMBODIMENT

A pyrotechnic package filled with pyrotechnic pellets selected from the pyrotechnic pellets consisting of boron-potassium nitrate ($B/KNO_3$), aluminum-potassium perchlorate ($Al/KClO_4$), titanium-aluminum-potassium perchlorate ($Ti-Al/KClO_4$), and large granules of black powder is employed in accordance with this invention to obviate the need for any redesign of the pyrogen igniter hardware or pyrogen propellant configuration of a pyrogen ignition system which would be required to sweep away any undesirable surface components on the propellant of a solid propellant rocket motor while maintaining the proper pressure within the solid propellant rocket motor.

In further reference to the drawing, the single FIGURE depicts a pyrogen ignitable solid propellant rocket motor 10 having a rocket motor case 12 which contains a solid propellant, perforated grain 14 therein. An exhaust nozzle 16 is shown positioned at the aft end of the rocket motor. At the forward end of the rocket motor is shown a safe and arm device with an initiator 18 for igniting the pyrogen propellant 20 contained in the pyrogen igniter 22 having an exhaust nozzle 24. The hot exhaust gases exiting from the pyrogen igniter exhaust nozzle, if operating as required, serves to sweep away undesirable surface components on propellant 14, ignites the propellant 14, and maintains proper pressure in the rocket motor chamber for proper operation of the rocket motor. However, applicant has found that the pyrogen igniter operates to perform the described functions more efficiently by employing an add-on pyrotechnic package in combination with the pyrogen igniter as further described below.

With additional reference to the drawing, applicant's improvement depicts an add-on pyrotechnic package 26 which contains pyrotechnic pellets 28. The add-on pyrotechnic package is shown positioned over the pyrogen igniter exhaust nozzle 24. The pyrotechnic container or pyrotechnic package 26 is constructed of pressed paper, plastic, or thin perforated metal. When the pyrogen ignition system is fired the pyrogen exhaust gases impinge onto and ignite the pyrotechnic pellets contained in the pyrotechnic package. The combination of the pyrogen exhaust gases and the hot gases and hot particles from the burning pyrotechnic pellets provide a more energetic means for sweeping the surfaces of the propellant 14 of undesired components either migrated or formed from chemical reactions, igniting the propellant 14, and maintaining the proper pressure within the solid propellant rocket motor.

The pyrotechnic pellet sizes may vary, depending on the rocket motor length. The pyrotechnic pellets of cylindrical shape from about $\frac{1}{8}$ inch in diameter by $\frac{1}{4}$ long to about $\frac{1}{2}$ inch in diameter by $\frac{1}{2}$ inch long, e.g., aspirin shaped, or intermediate sizes in between are the preferred size ranges for use. Some of criteria considered for pyrotechnic pellet size range selection include the pyrogen igniter size, the operating pressure of the rocket motor, and the rocket motor length. The pyrotechnic pellet size selected should be easily ignited by the pyrogen igniter exhaust gases and should be completely burned or consumed to produce hot gases prior to being discharged through the rocket motor nozzle as combustion gases along with the combustion gases from the burning solid propellant perforated grain. The general relationship existing between the pyrotechnic pellet sizes selected and the rocket motor length is as follows: the longer the rocket motor length, the larger the pyrotechnic pellets should be for inclusion in the pyrotechnic package. The quantity of the pyrotechnic pellets and the size of the pyrotechnic package are predetermined to provide the desired ignition pressures for the rocket motor after sweeping away the undesirable migrated propellant components or chemical reactant components from the solid propellant surfaces.

The add-on pyrotechnic package of this invention provides a means to overcome deficiencies which normally would require redesigns of the pyrogen igniter output. These redesigns generally require changes to the hardware of the pyrogen igniter as well as the pyrogen propellant configuration. The use of the pyrotechnic package of this invention obviates the need for such design changes.

I claim:

1. In a solid propellant rocket motor having a solid propellant perforated grain contained in a case, an exhaust nozzle at the aft end of said case and a pyrogen igniter at the forward end of said case, said pyrogen igniter including:
   (i) an exhaust nozzle for exhausting hot gases;
   (ii) an add-on pyrotechnic package secured to said pyrogen exhaust nozzle, said add-on pyrotechnic package comprising a suitable container for containing pyrotechnic pellets; and,
   (iii) pyrotechnic pellets contained in said container which are ignitable by hot pyrogen exhaust gases when said hot pyrogen exhaust gases impinge upon said pellets and produces rapid burning of said pellets that are subsequently discharged in the form of hot gases and hot particles along with said hot pyrogen exhaust gases to perform the functions of rapidly sweeping away any undesirable solid propellant perforated grain constituents that have migrated to the surface of said solid propellant perforated grain or reaction products that have formed on said surface from chemical reactions, rapidly igniting said solid propellant, perforated grain, and maintaining a high pressure rate rise in said solid propellant rocket motor which achieves improved ignition and performance of said propellant rocket motor.

2. The pyrogen igniter of claim 1 wherein said suitable container for said add-on pyrotechnic package is fabricated from a material selected from plastic, perforated metal, and pressed paper and wherein said pyrotechnic pellets are selected from the pyrotechnic pellets consisting of boron-potassium nitrate ($B/KNO_3$), aluminum-potassium perchlorate ($Al/KClO_4$), titanium-aluminum-potassium perchlorate ($Ti-Al/KClO_4$), and large granules of black powder.

* * * * *